US011035210B2

(12) United States Patent
Sun et al.

(10) Patent No.: US 11,035,210 B2
(45) Date of Patent: Jun. 15, 2021

(54) OPTIMIZED FOAM APPLICATION FOR HYDROCARBON WELL STIMULATION

(71) Applicant: Halliburton Energy Services, Inc., Houston, TX (US)

(72) Inventors: Jianlei Sun, Katy, TX (US); Travis Larsen, Houston, TX (US); Terry Wong, Spring, TX (US); Ron Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 280 days.

(21) Appl. No.: 16/166,959

(22) Filed: Oct. 22, 2018

(65) Prior Publication Data
US 2020/0123886 A1    Apr. 23, 2020

(51) Int. Cl.
E21B 43/16    (2006.01)
C09K 8/60     (2006.01)
(Continued)

(52) U.S. Cl.
CPC ............ *E21B 43/166* (2013.01); *C09K 8/602* (2013.01); *C09K 8/94* (2013.01); *G01V 99/005* (2013.01);
(Continued)

(58) Field of Classification Search
CPC ....... E21B 43/166; G06F 30/20; C09K 8/602; C09K 8/94; G01V 99/005;
(Continued)

(56) References Cited

U.S. PATENT DOCUMENTS 7,225,869 B2    6/2007    Willett et al.
8,991,499 B2    3/2015    Nevison
(Continued)

FOREIGN PATENT DOCUMENTS

WO    2016086295    6/2016
WO    2017058484    4/2017
(Continued)

OTHER PUBLICATIONS

Lashgari et al., "Recent Developments in Hybrid Surfactant-Gas EOR Mechanisms with Advanced Modeling", SPE-190274-MS, The University of Texas at Austin, 2018, pp. 1-27.
(Continued)

*Primary Examiner* — Roy Y Yi
*Assistant Examiner* — Geoffrey T Evans
(74) *Attorney, Agent, or Firm* — Kilpatrick Townsend & Stockton LLP

(57) ABSTRACT

Certain aspects and features relate to a system that projects an optimized foam-fluid-application scenario for to stimulate production from a hydrocarbon well. The optimized scenario can include a recommended chemical make-up for the foam entity as well as application parameters such those related to timing and duration. A hybrid discrete fracture network and multi-porosity (DFN-MP) model for fluid interaction with the formation where the well is located can be produced by a processing device. The hybrid DFN-MP model can be optimized using field simulation data for the formation. The optimized hybrid DFN-MP model can be used by the processing device to produce an optimized foam-fluid-application scenario, which can be communicated to at least one well and can be utilized to stimulate the well for increased production.

19 Claims, 17 Drawing Sheets

(51) Int. Cl.
*C09K 8/94* (2006.01)
*G06F 30/20* (2020.01)
*G01V 99/00* (2009.01)

(52) U.S. Cl.
CPC ........ *G06F 30/20* (2020.01); *G01V 2210/614* (2013.01); *G01V 2210/6244* (2013.01); *G01V 2210/6246* (2013.01); *G01V 2210/646* (2013.01); *G01V 2210/66* (2013.01)

(58) Field of Classification Search
CPC ..... G01V 2210/614; G01V 2210/6244; G01V 2210/6246; G01V 2210/646; G01V 2210/66
See application file for complete search history.

(56) References Cited

U.S. PATENT DOCUMENTS

| | | | |
|---|---|---|---|
| 9,033,035 | B2 | 5/2015 | Nevison |
| 9,181,789 | B2 | 11/2015 | Nevison |
| 9,187,996 | B1 | 11/2015 | Nevison et al. |
| 9,695,664 | B2 | 7/2017 | Rodela et al. |
| 9,759,053 | B2 | 9/2017 | Mendell |
| 9,790,775 | B2 | 10/2017 | Joseph et al. |
| 2013/0297272 | A1* | 11/2013 | Sung .................... G01V 99/005 703/10 |
| 2016/0102538 | A1 | 4/2016 | Murrell |
| 2016/0333275 | A1 | 11/2016 | Matteucci et al. |
| 2016/0355715 | A1 | 12/2016 | Chung et al. |
| 2016/0355743 | A1 | 12/2016 | Matteucci et al. |
| 2017/0159416 | A1 | 6/2017 | Sheng |
| 2017/0191348 | A1* | 7/2017 | AlThawad .......... E21B 41/0092 |
| 2017/0247997 | A1 | 8/2017 | Kovalevsky |
| 2018/0010429 | A1* | 1/2018 | Willberg ................. E21B 43/26 |
| 2018/0223638 | A1* | 8/2018 | Gassara .................. E21B 47/06 |

FOREIGN PATENT DOCUMENTS

| | | |
|---|---|---|
| WO | 2017058485 | 4/2017 |
| WO | 2017058487 | 4/2017 |

OTHER PUBLICATIONS

Lotfollahi et al., "Optimization of Surfactant Flooding in Tight Oil Reservoirs", URTec: 2696038, The Unitverisity of Texas at Austin, 2017, pp. 1-13.

Xinfeng et al., "Gasflooding-Assisted Cyclic Solvent Injection (GA-CSI) for Enhancing Heavy Oil Recovery", SPE-170157-MS, SPE Heavy Oil Conference—Canada, 2014, pp. 1-19.

Zhang et al., "Upscaling Laboratory Result of Surfactant-Assisted Spontaneous Imbibition to the Field Scale through Scaling Group Analysis, Numerical Simulation, and Discrete Fracture Network Model", SPE-190155-MS, 2018, Texas A&M University, pp. 1-24.

* cited by examiner

US 11,035,210 B2

OPTIMIZED FOAM APPLICATION FOR HYDROCARBON WELL STIMULATION

TECHNICAL FIELD

The present disclosure relates generally to automated design of a foam fluid entity and scenario for its application to a well. More particularly, the present disclosure relates to a system that determines an optimized application scenario for the foam fluid entity in order to stimulate a hydrocarbon well to improve production.

BACKGROUND

Horizontal oil wells often exhibit steep production decline within the first few years of operation. Instead of continuously drilling new wells or continuously fracturing existing wells, enhanced oil recovery (EOR) techniques can stimulate the existing wells and thus increase well production efficiently and economically. One such EOR technique is foam EOR, sometimes also referred to as foam huff-n-puff or foam flooding. Laboratory experiments have demonstrated increased oil recovery from foam treatment even after gas injection has been used. Foam is a combined fluid entity (combined fluid system) of gas and water with surfactant as the foaming agent. Foam can also include demulsifiers and clay stabilizers. The ratios of the various components of a foam entity can vary considerably, as can application parameters such as timing and duration. The exact combination of these factors needed to produce the best results varies widely depending on the characteristics of the specific reservoir formation into which a well has been bored.

DETAILED DESCRIPTION

Figure 1:
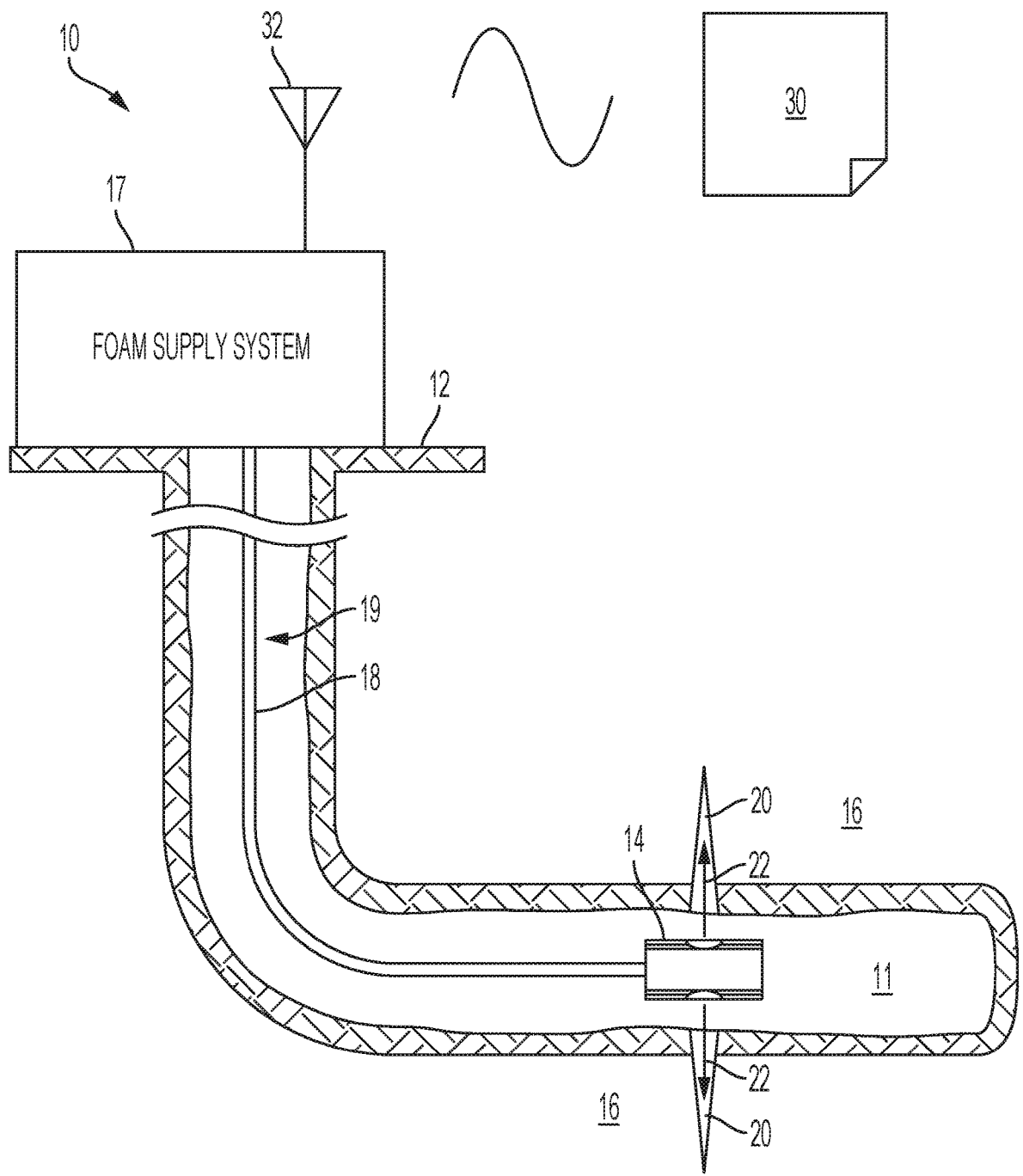
FIG. 1 is a schematic, cross-sectional diagram of a well system in which an optimized foam-fluid-application scenario is being carried out according to some aspects of the present disclosure.

Certain aspects and features relate to a system that improves, and makes more efficient, the projection of an optimized foam-fluid-application scenario for foam flooding a hydrocarbon well to stimulate production from a hydrocarbon reservoir. The optimized scenario can be computed considering core sample data from the formation that includes the hydrocarbon well. The optimized scenario can include a recommended chemical make-up for the foam entity as well as application parameters such those related to timing and duration. The optimized scenario can be communicated to at least one well in the formation and can be utilized to stimulate the well and increase production from the well and the reservoir.

Foam is a combined fluid system (combined fluid entity) of gas and water with foaming agent surfactant. It can be especially difficult to project productivity gains or productivity variations from foam fluids when applied to some reservoirs, for example, unconventional shale reservoirs. There are important differences between recovery mechanisms in unconventional reservoirs versus those in conventional reservoirs and the differences can lead to complexities. Certain aspects of this disclosure include a modeling and evaluation data processing workflow to estimate productivity of a well in a formation including a hydrocarbon reservoir when stimulated with the foam fluid entity. The process in certain aspects includes data collection, computerized design of a model for fluid interaction with the formation, simulation interpretation, and optimization of stimulation operation conditions.

A system according to some examples includes a processing device that matches a core-scale model with core plug data from a formation including a hydrocarbon reservoir. The matching can be used to produce relative permeability curves, capillary pressure curves, and adsorption and wettability alteration curves for the formation. A hybrid discrete fracture network and multi-porosity (DFN-MP) model for fluid interaction with the formation is produced in some aspects by the processing device using the curves. The hybrid DFN-MP model can be history-matched with field production data and then optimized for the formation to produce an optimized hybrid DFN-MP model for fluid interaction with the formation. The optimized hybrid DFN-MP model can be used by the processing device to produce an optimized foam-fluid-application scenario using the optimized hybrid DFN-MP model. The scenario can be communicated to a well or wells in the formation and applied to increase production from the hydrocarbon reservoir.

In some aspects, the hybrid DFN-MP model is produced at least in part by defining grid blocks along the dimensions of the reservoir of interest and assigning local grid refinement properties to the grid blocks. In some aspects, both initial and altered water-wet curves are established and pressure-volume-temperature (PVT) properties for foam components are established. Chemical reactions can be determined for one or more of the foam components, and upscaled absorption and wettability curves can be produced from the core-scale model to produce the hybrid DFN-MP model. In some aspects, the processing device also matches the hybrid DFN-MP model with type curve data for production from at least one well in the formation to reduce uncertainty in the hybrid DFN-MP model.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 shows an example of a well system 10 including a horizontal wellbore 11 in a formation 12. Wellbore 11 can be either open hole or lined with a casing string or liner (not shown). A foam application tool 14 is placed into the wellbore 11 at a location of interest, e.g., adjacent to a zone 16 in the subterranean formation 12. The foam application tool 14 is attached to coil tubing 18, which lowers the foam application tool 14 into the wellbore 11 and supplies the tool with a foam entity. Annulus 19 is formed between the coil tubing 18 and the wellbore 11. The foam application tool 14 is supplied with a foam entity from foam supply system 17, which includes the chemical components to mix the foam entity and control valves (not shown) to set the timing, duration, and volume of foam application. The foam application tool 14 then operates to flood the wellbore and fractures 20 in the zone 16, with foam 22 as shown in FIG. 1 in order to stimulate production from the wellbore 11. An optimized foam-fluid-application scenario 30 according to certain aspects described herein is wirelessly communicated to foam supply system 17 through antenna 32 and determines the foam entity composition and the foam application parameters.

Figure 2:
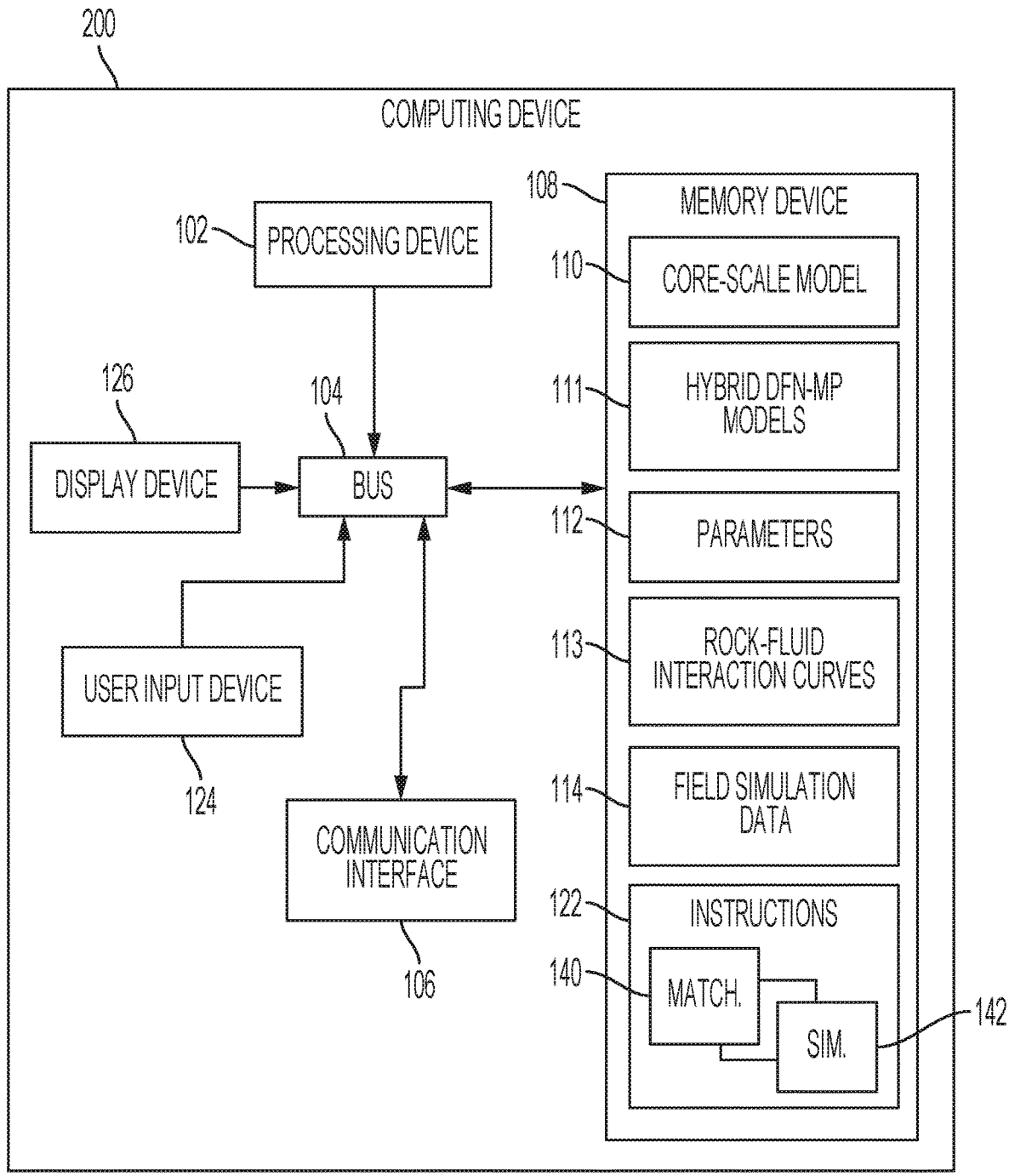
FIG. 2 is a block diagram depicting a system for carrying out foam fluid application optimization according to some aspects of the present disclosure.

FIG. 2 depicts a system including a computing device 200 according to one example. The computing device 200 includes a processing device 102, a bus 104, a communication interface 106, a non-transitory memory device 108, a user input device 124, and a display device 126. In some examples, some or all of the components shown in FIG. 2 can be integrated into a single structure, such as a single housing. In other examples, some or all of the components shown in FIG. 2 can be distributed (e.g., in separate housings) and in communication with each other.

The processing device 102 can execute one or more operations for providing an optimized foam-fluid-application scenario for foam flooding a hydrocarbon well to stimulate production from a hydrocarbon reservoir. The processing device 102 can execute instructions 122 stored in the memory device 108 that are executable by the processing device 102 to perform the operations. The processing device 102 can include one processing device or multiple processing devices. Non-limiting examples of the processing device 102 include a Field-Programmable Gate Array ("FPGA"), an application-specific integrated circuit ("ASIC"), a microprocessing device, etc.

The processing device 102 can be communicatively coupled to the memory device 108 via the bus 104. The non-transitory memory device 108 may include any type of memory device that retains stored information when powered off. Non-limiting examples of the memory device 108 include electrically erasable and programmable read-only memory ("EEPROM"), flash memory, or any other type of non-volatile memory. In some examples, at least some of the memory device 108 can include a non-transitory medium from which the processing device 102 can read instructions. A non-transitory computer-readable medium can include electronic, optical, magnetic, or other storage devices capable of providing the processing device 102 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C #, etc.

In the example of FIG. 2, the memory device 108 includes core-scale model 110, constructed from core plug data gathered for the relevant formation. The computer program instructions 122 include matching algorithms 140. These matching algorithms can provide history matching that can refine the core-scale model 110 and produce rock-fluid interaction curves 113 from the core-scale model 110. The memory device 108 also includes hybrid DFN-MP models 111 that can characterize fluid interaction with the formation or formations. The hybrid DFN-MP model 111 can be refined using matching algorithms 140. The memory device 108 can include parameters 112. The parameters can include, as examples, relative permeability curves and capillary pressure curves, adsorption and wettability alteration curves obtained from core plug laboratory measurements, results of history matching performed by matching algorithms 140, foam injection parameters, and mixture ratios for the foam entity components. The memory device 108 includes field simulation data 114. In addition to matching algorithm 140, computer program instructions 122 include simulation algorithm 142, to run production simulations that can be used to evaluate and improve the hybrid DFN-MP model 111.

In the example of FIG. 2, the computing device 200 includes a communication interface 106. The communication interface 106 can represent one or more components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network). Communication interface 106 can be used to communicate an optimized foam-fluid-application scenario to a well or wells in the formation of interest.

In the example of FIG. 2, the computing device 200 includes a user input device 124. The user input device 124 can represent one or more components used to input data. Examples of the user input device 124 can include a keyboard, mouse, touchpad, button, or touch-screen display, etc.

In the example of FIG. 2, the computing device 200 includes a display device 126, which can display parameters described herein and other information used in the process described herein. The display device 126 can represent one or more components used to output data. Examples of the display device 126 can include a liquid-crystal display (LCD), a computer monitor, a touch-screen display, etc. In some examples, the user input device 124 and the display device 126 can be a single device, such as a touch-screen display.

Figure 3:
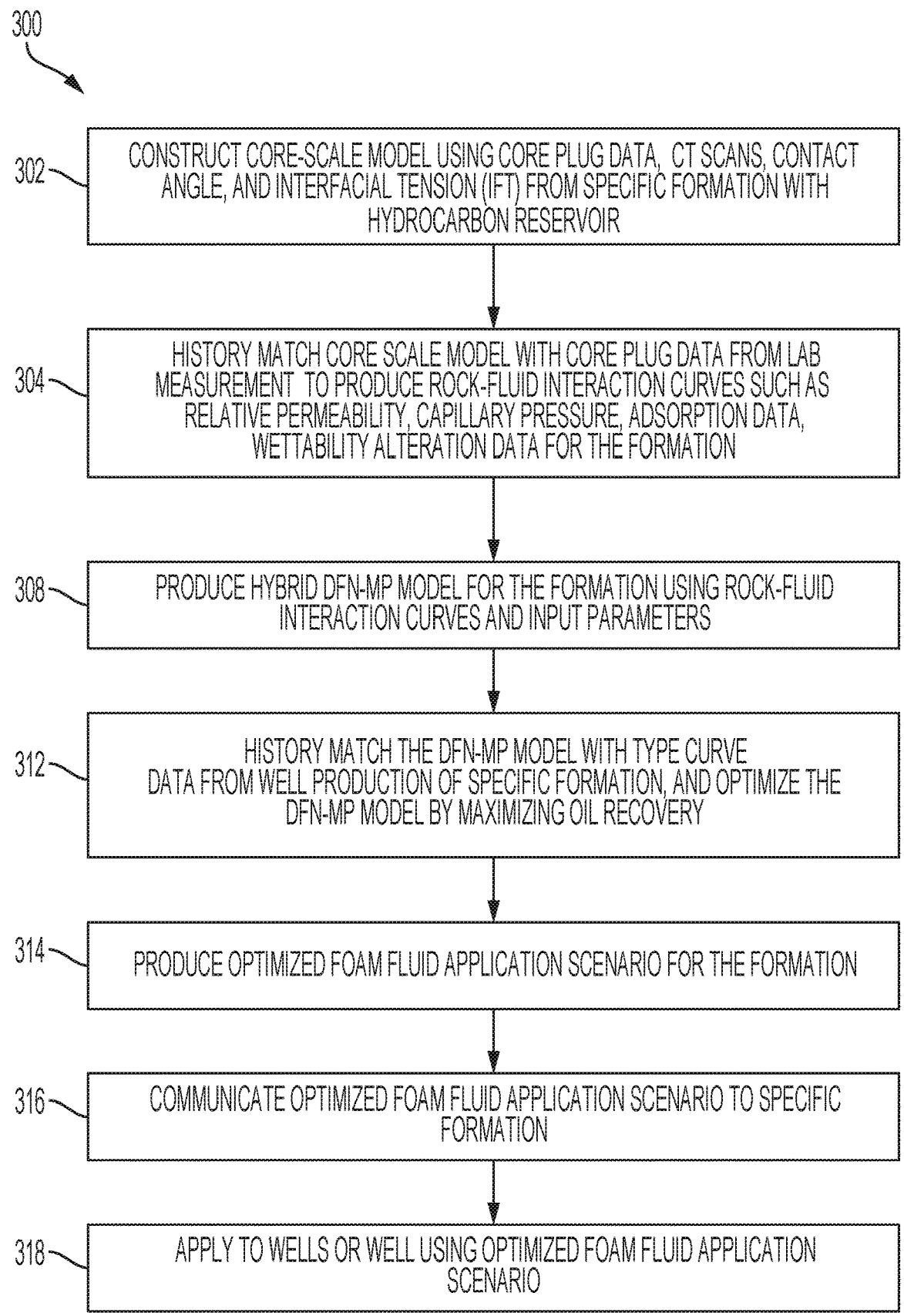
FIG. 3 is a flowchart illustrating a method of producing a foam-fluid-application scenario according to some aspects of the present disclosure.

FIG. 3 is a flowchart showing a process 300 for providing an optimized foam-fluid-application scenario and foam flooding a hydrocarbon well to stimulate production from a hydrocarbon reservoir according to some aspects. At block 302 a 3D core-scale model is constructed using core plug data and CT scans, contact angle, and interfacial tension (IFT). The core plugs used can be retrieved from the specific formation with the hydrocarbon reservoir of interest. At block 304 processing device 102 uses a matching algorithm 140 to history match the core-scale model with core plug data from lab measurement to produce relative permeability curves capillary pressure curves, and adsorption and wettability alteration curves for the formation. At block 308, a hybrid DFN-MP model 111 is produced for the formation using the various input parameters such as reservoir porosity and permeability, reservoir dimensions, reservoir temperature, hydraulic fracture porosity and permeability, hydraulic fracture dimensions, number of hydraulic fractures, natural fracture porosity and permeability, and natural fracture densities. The hybrid DFN-MP model 111 can simulate fluid interaction with the formation.

Still referring to FIG. 3, at block 312, the hybrid DFN-MP model is optimized. A matching algorithm 140 can be used in some aspects to history match the hybrid DFN-MP model with type curve data from actual well production for the specific formation of interest. Such history matching can reduce uncertainties in the hybrid DFN-MP model. Additionally, according to some aspects, processing device 102 optimizes the hybrid DFN-MP model 111 by making adjustments based on simulations and output analysis to produce an optimized hybrid DFN-MP model to accurately simulate fluid interaction with the formation. At block 314, an optimized foam-fluid-application scenario is produced for the formation and at block 316 this scenario can be communicated to a well or wells to be stimulated through communication interface 106. At block 318 the foam-fluid-application scenario can be applied to well or wells in formation by formulating the foam entity and applying it to the well by foam flooding according to the scenario. The foam flooding can be carried out by operators and equipment at the well or wells without on-site decisioning.

During the process of applying surfactant alternating gas (SAG) or surfactant gas coinjection (SGC) foam to wells in unconventional reservoirs, the foam can be treated as a carrying agent for the surfactant. One cycle of foam flooding includes injection of foam down to fractures 20 in FIG. 1, shut-in and soaking of the well for a period of time, and finally well production for another period of time. One cycle or more than one cycle of huff-n-puff is used. Such a process is sometimes referred to as huff-n-puff. Foam Huff-n-puff can be applied for a single well as shown in FIG. 1, or multiple wells in which each well is operated as FIG. 1. The foam brings surfactant solutions deep into the fracture network of the formation. The surfactant changes the wettability of the rock from the original wettability to water-wet and thus enhances capillary-assisted imbibition. The injected gas phase component plays a role of re-pressurization and creates flow-back energy to bring the oil in the deep fracture network back to primary hydraulic fractures, wellbore, and further to the surface.

Contrary to foam huff-n-puff in conventional reservoirs where interfacial tension reduction, and gas mobility control are the most important considerations to be modeled in reservoir simulators, wettability alteration and miscible re-pressurization are more important mechanisms for modeling unconventional shale reservoirs. Thus, the hybrid DFN-MP model 111 according to some aspects treats surfactant as a tracer or solid component which can be transported along with the aqueous phase component and can be adsorbed to the rock surface through a chemical reaction equilibrium equation. The chemical reaction rate is proportional to surfactant concentration in the aqueous phase.

The injected foam fluid entity in some aspects is characterized as oil components by pressure-volume-temperature (PVT) analysis, two water components (i.e., water component and surfactant tracer component) in the aqueous phase, and an adsorbed phase component on the rock surface. During the process of chemical reactions, the surfactant tracer component is adsorbed onto the rock surface. Depending on the absorbed surfactant concentration, the rock wettability can be derived from the input relationship and then used for linear interpolation of two sets of rock-fluid interaction curves 113 (i.e., original and altered conditions).

The hybrid DFN-MP model 111 can capture rock-fluid interactions for rock matrix and fractures. In some aspects, three domains are defined as matrix, natural fractures, and hydraulic fractures. Matrix rock-fluid interaction curves can be determined from the core-scale modeling results. Both hydraulic and natural fractures can be modeled as straight lines with or without capillary pressures. The impact of surfactant concentration can be modeled as a changing composition of the foam fluid system, e.g., mole fraction of the surfactant component in the aqueous phase. Surfactant adsorption can be modeled correspondingly as part of a process of chemical reaction.

Producing and optimizing the hybrid DFN-MP model can be accomplished using data collected and organized as groups of parameters. In one example, these groups of parameters serve as inputs for the hybrid DFN-MP model 111. In this example, parameters in the first group include those obtained from history matching in block 312 of FIG. 3. The first group in this example can include reservoir rock properties: porosity, permeability, reservoir dimensions, and temperature. The first group also includes hydraulic and natural fracture properties: for hydraulic factures, porosity, permeability, fracture dimensions, and number of hydraulic fractures, and for natural fractures, porosity, permeability, and fracture densities. A second group of parameters in this example can include those gathered from laboratory measurements, including the imbibition data and CT scan data in block 302 and 304 of FIG. 3. The second group in this example can include rock and fluid interaction properties, which can be organized into tables, pressure-volume-temperature (PVT) data from laboratory measurements, and relative permeability and capillary pressure curves upscaled from laboratory measurements using the core-scale model 110.

A third group of parameters in this example can include those related to field operations that are used to optimize the model at block 312 of FIG. 3. These parameters can be organized according to the type of field simulation done to obtain the parameters. Parameters from a gas huff-n-puff ($CO_2$, $N_2$, hydrocarbon mixtures) can include: gas injection composition, rate, maximum bottom-hole injection pressure, number of huff-n-puff cycles, injection period, soaking period, and production period. Parameters from a water huff-n-puff can include: water injection rate, maximum bottom-hole injection pressure, number of huff-n-puff cycles, injection period, soaking period, and production period. Parameters from a surfactant huff-n-puff can include: water injection rate, maximum bottom-hole injection pressure, number of huff-n-puff cycles, injection period, soaking period, production period, surfactant concentration, surfactant reaction rate, surfactant reaction equilibrium table (i.e., absorption table), and wettability alteration curves. Parameters from a water-surfactant alternating gas huff-n-puff (SAG), at least some of which are organized into tables, can include: water injection rate, maximum bottom-hole injection pressure, number of huff-n-puff cycles, injection period, soaking period, production period, surfactant concentration, surfactant reaction rate, surfactant reaction equilibrium table (i.e., absorption table), wettability alteration curves, gas injection rate, injection gas-liquid ratio, and gas injection composition. Parameters from a water-surfactant gas co-injection huff-n-puff (SAC) can include: water injection rate, maximum bottom-hole injection pressure, number of huff-n-puff cycles, injection period, soaking period, production period, surfactant concentration, surfactant reaction rate, surfactant reaction equilibrium table (i.e., absorption table), wettability alteration curves, injection gas-liquid ratio, gas injection composition, and gas injection rate.

Figure 4:
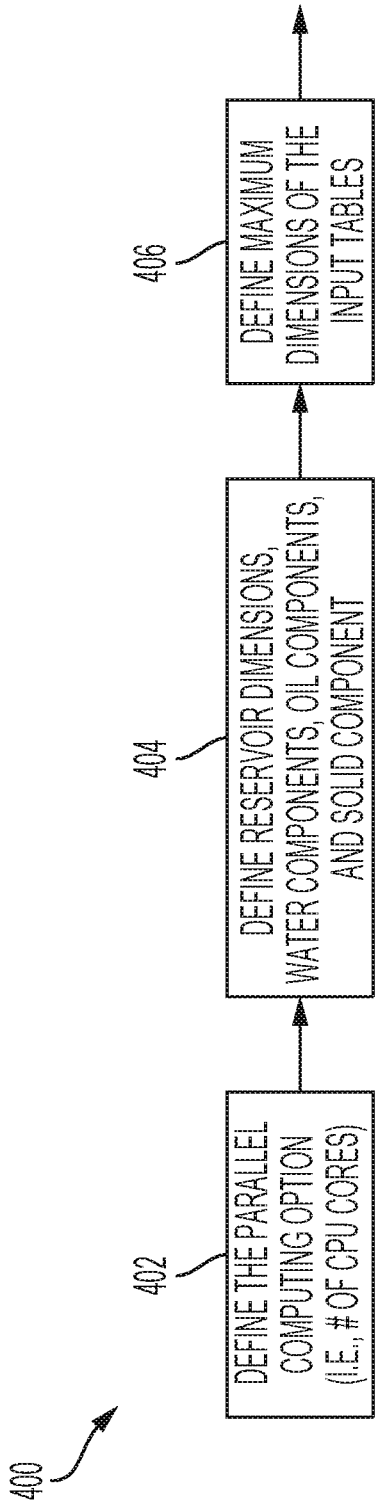
FIG. 4 is a flowchart illustrating a method used in producing a foam-fluid-application scenario according to some aspects of the present disclosure.
Figure 5:
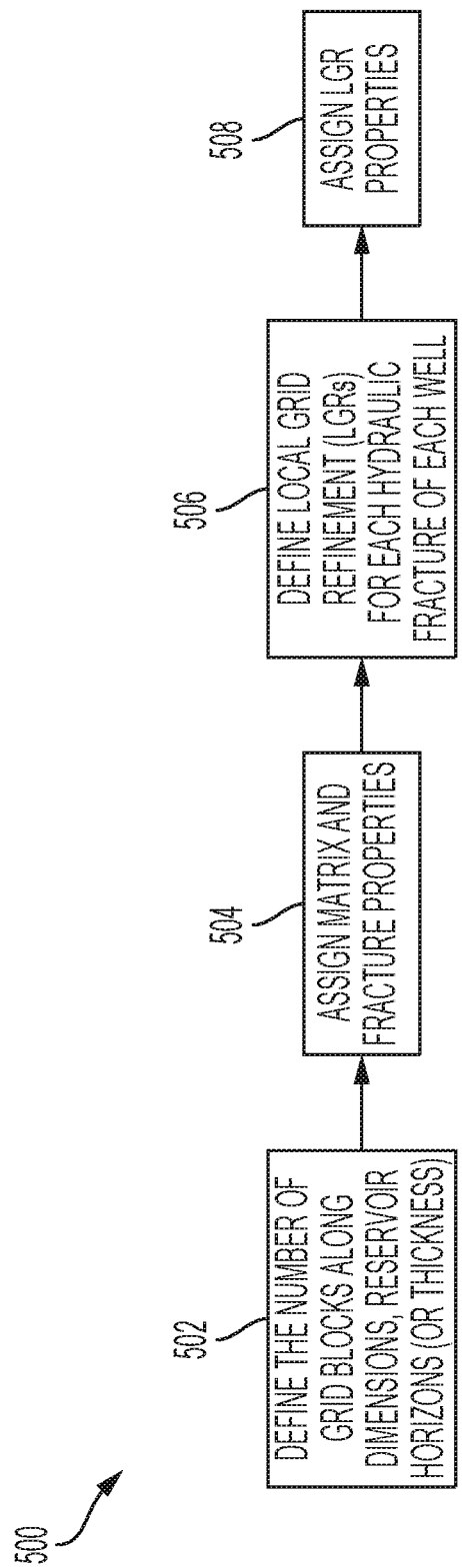
FIG. 5 is a flowchart illustrating another method used in producing a foam-fluid-application scenario according to some aspects of the present disclosure.
Figure 6:
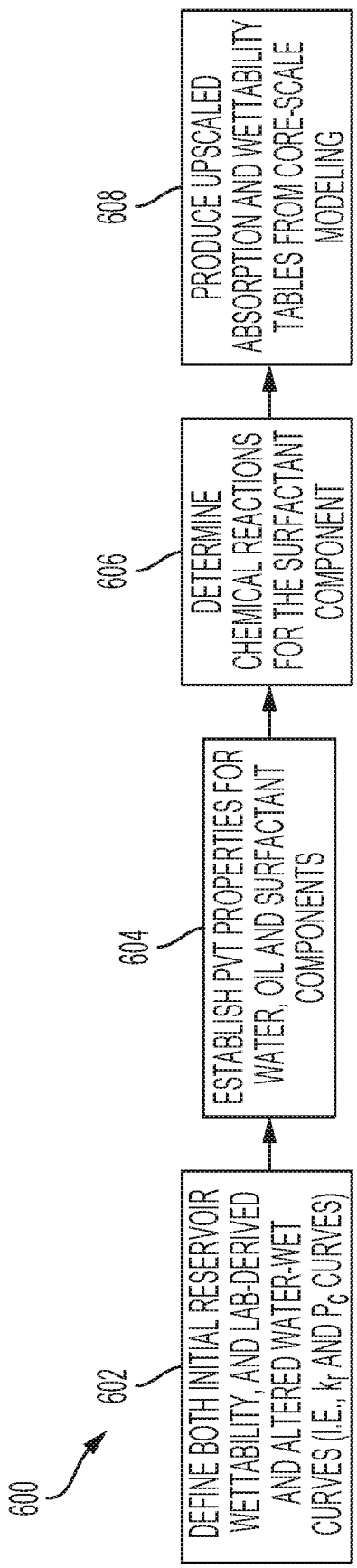
FIG. 6 is a flowchart illustrating an additional method used in producing a foam-fluid-application scenario according to some aspects of the present disclosure.

FIGS. 4, 5, and 6 are flowcharts illustrating the process for producing the hybrid DFN-MP model 111 at block 308 according to some aspects. In the example of FIG. 4, run specifications for producing the model are defined by process 400. At block 402, parallel computing options are defined. These options can include, as an example, the number of central processing unit (CPU) cores that are to be engaged. CPU cores may be combined in a single processing device or be spread across processing devices. At block 404, some reservoir and foam parameters are defined. In this example, these parameters include reservoir dimensions and the components of the foam, which in one example may include two water components, oil components, and one solid component. At block 406, maximum dimensions of input tables of parameters are set.

FIG. 5 is a flowchart for an example of a process 500 of setting up the grid defining blocks along the dimensions of the reservoir specified in FIG. 4. The grid block can be used to assign varying refinement properties across the reservoir in the hybrid DFN-MP model. At block 502, a number of grid blocks and dimensions, including the reservoir horizons (or thickness) are defined. At block 504 matrix and fracture properties are assigned to each grid block. At block 506, local grid refinements (LGRs) are defined for each hydraulic fracture of each well in the reservoir. At block 508, the properties of the LGRs are allocated and assigned to grid blocks.

FIG. 6 is a flowchart showing an example of a process 600 for determining the rock-fluid interaction properties to be captured in the hybrid DFN-MP model. For this process porosity types, for example, dual porosity or multi-porosity types, can be set. This setting can be based on distributions of matrix, micro/natural fractures, and kerogen. Hybrid DFN geometry types, for example, planar fractures or complex fracture geometries with lower angle interactions, can also be set. At block 602, initial reservoir wettability, lab-derived water-wet curves, and altered water-wet curves, for example, relative permeability ($k_r$) and capillary pressure ($P_c$) curves are defined. At block 604, PVT properties for water, oil and surfactant components of the foam are established, for example, by having them input by an operator or by retrieving stored data. At block 606, chemical reactions for the surfactant component of the foam are determined, by receiving input or retrieving stored information. At block 608, absorption and wettability tables are upscaled based on the core-scale model 110 in order to produce upscaled tables of appropriate size for use in the hybrid DFN-MP model.

Figure 7:
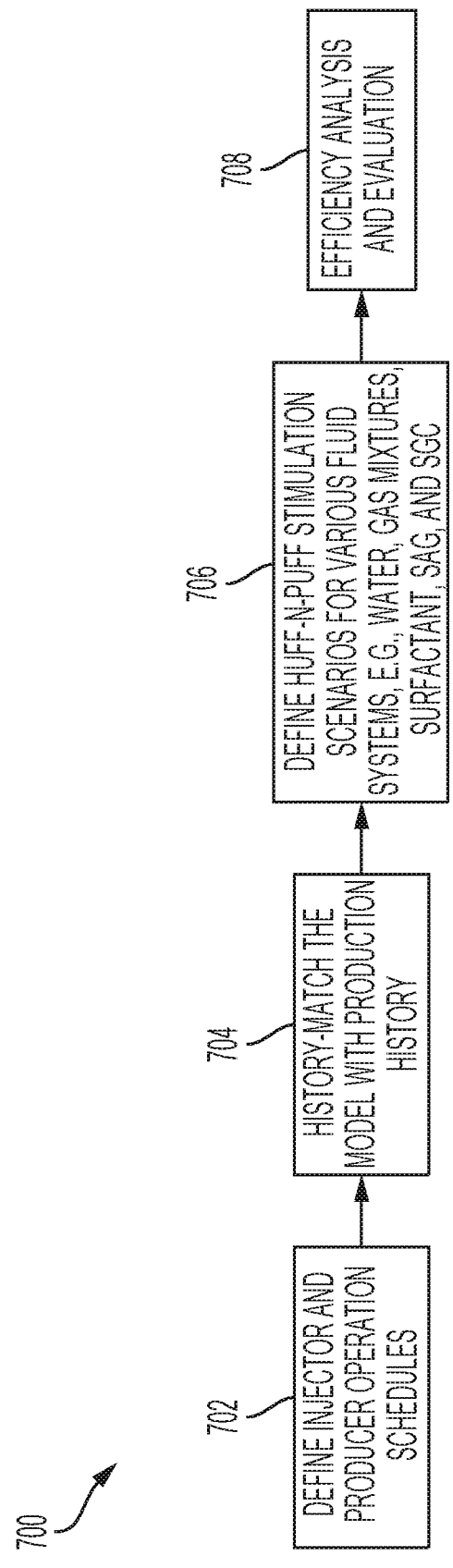
FIG. 7 is a flowchart illustrating a further method used in producing a foam-fluid-application scenario according to some aspects of the present disclosure.

FIG. 7 is a flowchart illustrating the process of block 312 for history-matching and optimizing an initial hybrid DFN-MP model according to some aspects. At block 702 initial injector and producer operation schedules are defined. For instance, for a single-well huff-n-puff, the well serves as both the injector and producer; for multiple-well huff-n-puff, the infill well is set as the injector and neighboring parent wells are set as producers. After the infill well soaks for a period of time, it switches to production, and meanwhile the parent wells become injectors. These potential schedules can be based on stored defaults or can be input by an operator. At block 704, a history matching algorithm is used to history match the initial hybrid DFN-MP model with type curve data from the actual well production history for the specific formation of interest in order to reduce uncertainties. At block 706 various simulation scenarios are defined for the available fluid systems, for example, huff-n-puff stimulation scenarios for potential foam entity mixtures, and for other conventional fluid systems including water, gas, surfactant which provides comparison with the foam entity mixtures. At block 708 the simulation results are analyzed and evaluated for efficiency. If greater efficiency is desired, the simulation parameters can be adjusted, and the simulations can be run again at block 706. This process can be repeated until a desired efficiency level is achieved. The foam-fluid-application scenario is optimized when the foam fluid flooding of the well or wells increases production enough so that the value of the increase in hydrocarbon output from the reservoir is greater than the cost of foam fluid application, taking into account any savings realized by avoiding other stimulation techniques. Efficiency in many cases can be higher, and the optimization processes according to certain aspects can be continued until a pre-defined efficiency goal is achieved.

Figure 8:
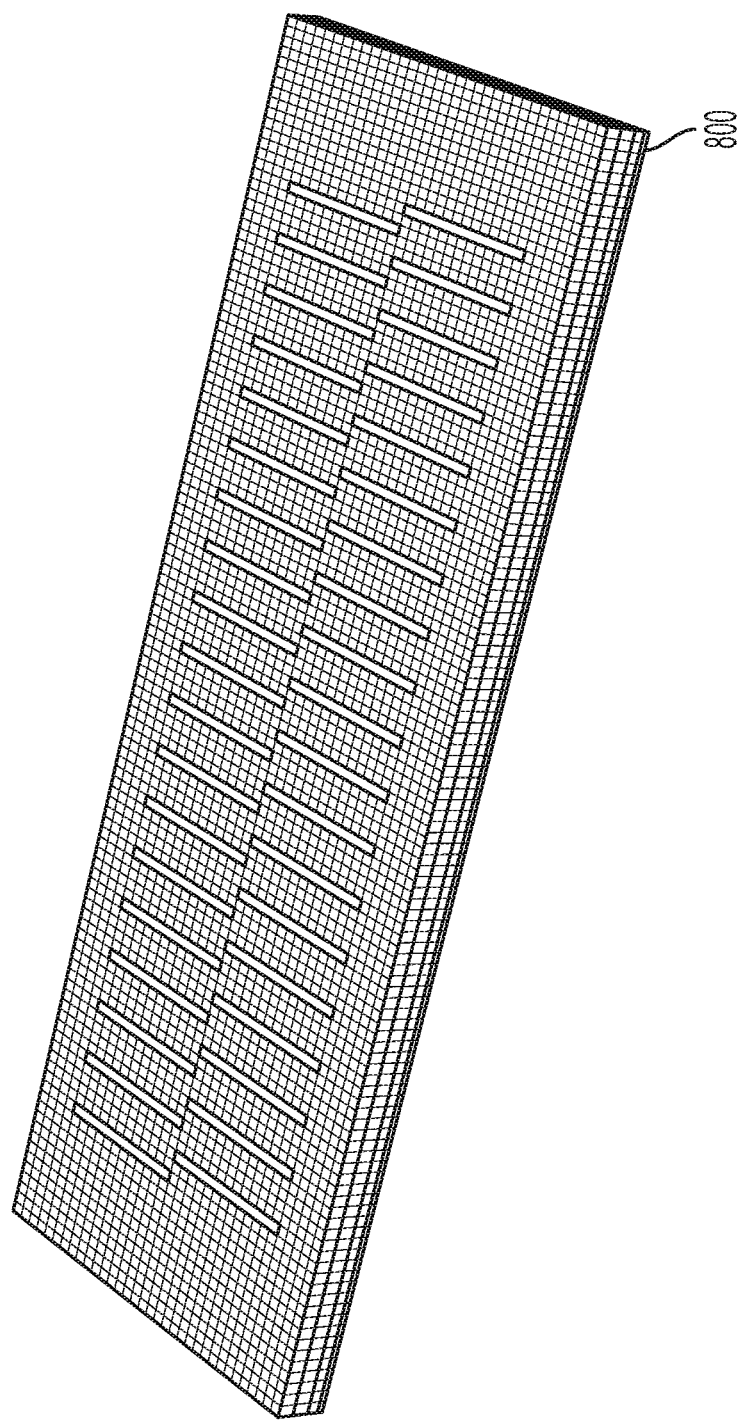
FIG. 8 is a graphical representation of an example reservoir and fracture geometries of the reservoir according to some aspects of the present disclosure.
Figure 9:
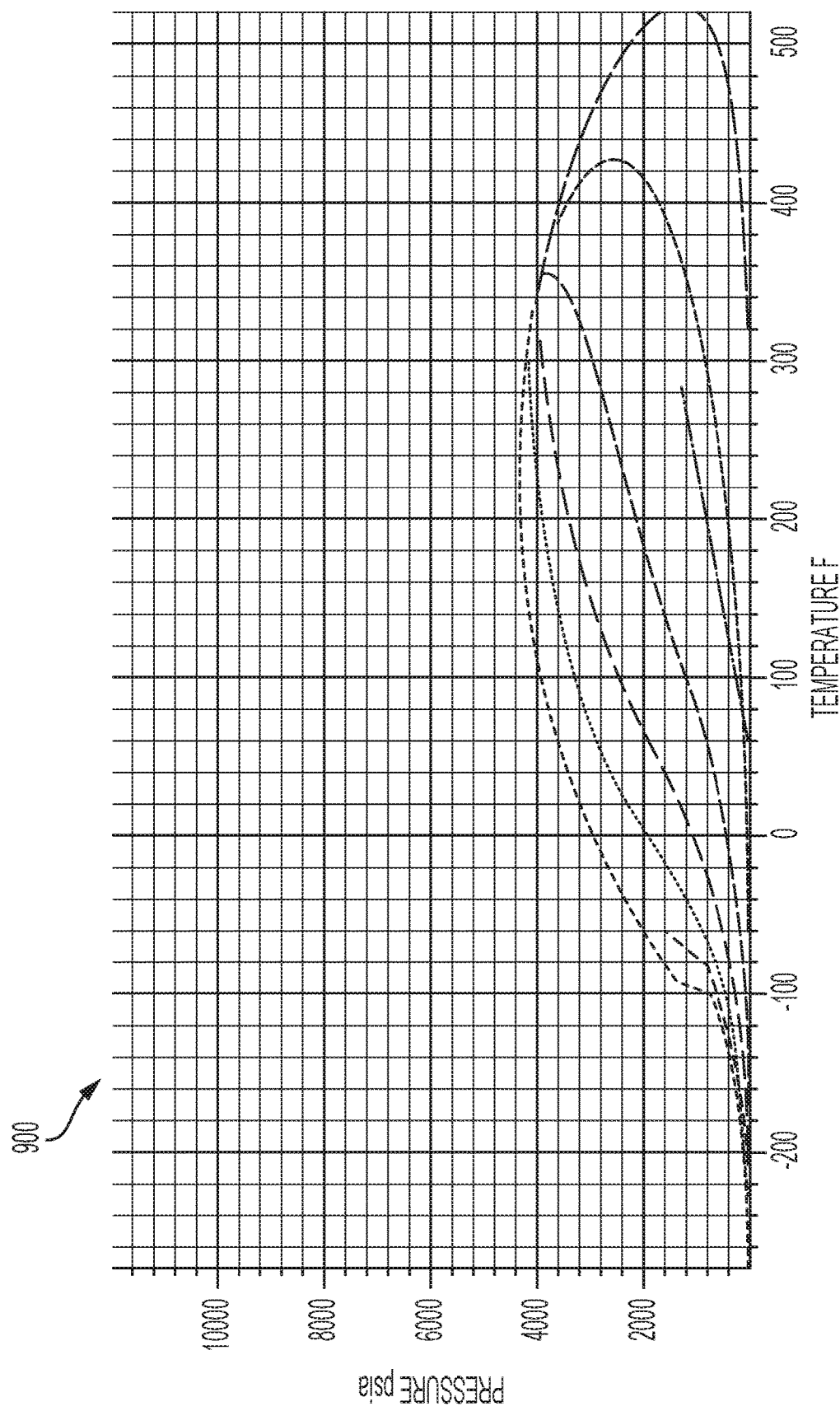
FIG. 9 is a graph of the phase envelope of volatile oil in an example reservoir according to some aspects of the present disclosure.
Figure 10:
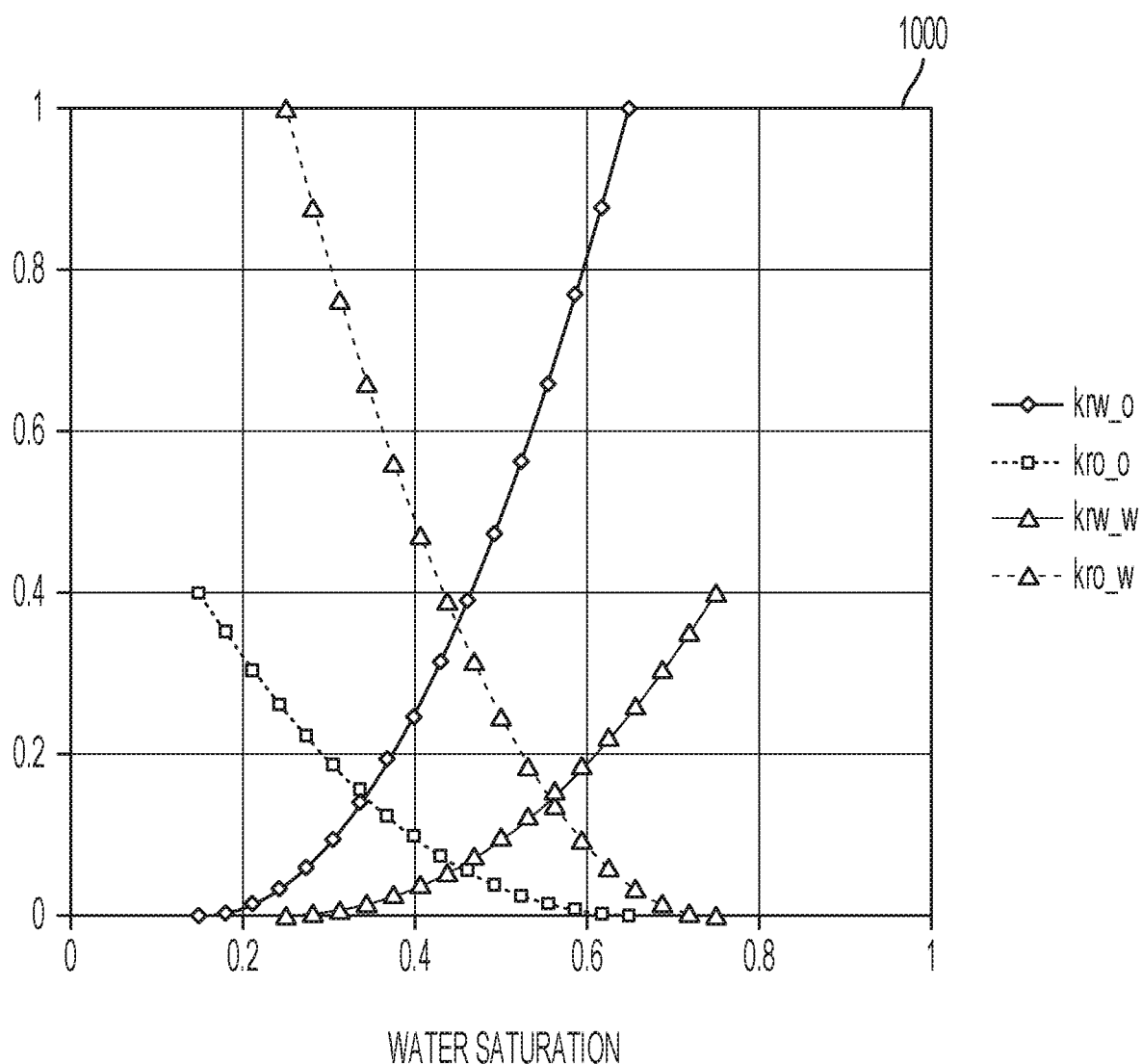
FIG. 10 and FIG. 11 are graphs of relative permeability curves for an example reservoir according to some aspects of the present disclosure.
Figure 11:
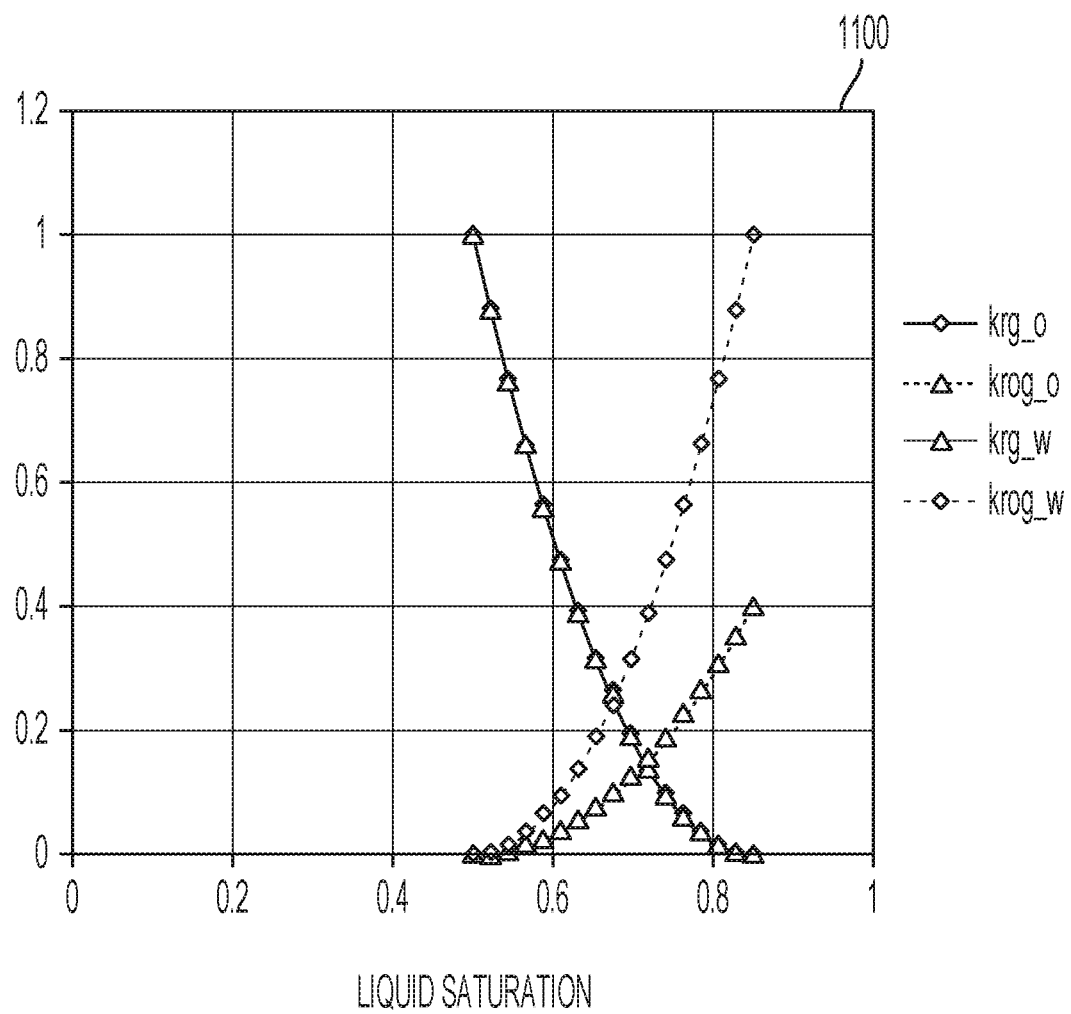
Figure 12:
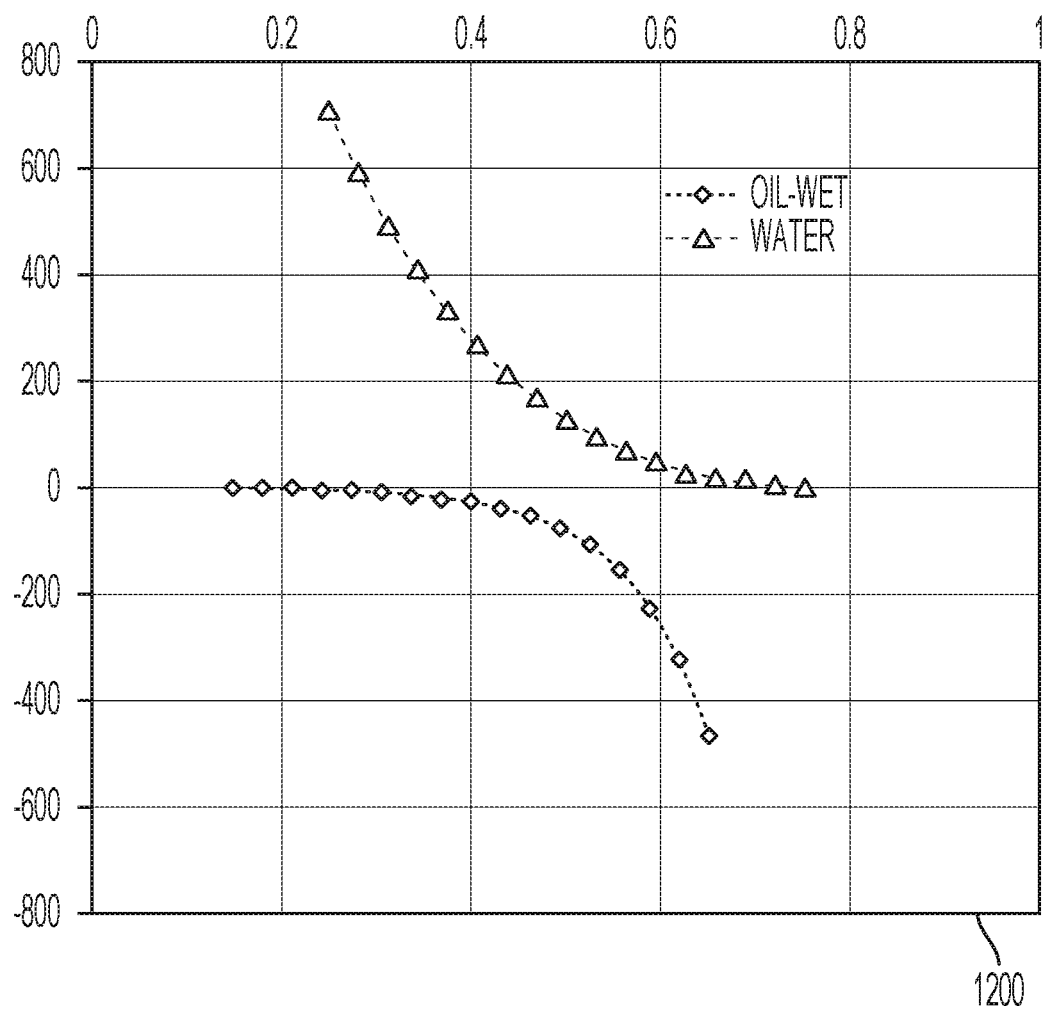
FIG. 12 is a graph of capillary pressure curves for an example reservoir according to some aspects of the present disclosure.

The above-described system and methods have been demonstrated with a case study in a shale formation with a volatile oil reservoir. A type well production with volatile oil was chosen and a compositional hybrid DFN-MP model with chemical reactions was built using the processes described above. FIG. 8 is a three-dimensional (3D) graph 800 of the reservoir fracture geometries. Top depths range from 12,675 feet to 12,869 feet. FIG. 9 is a phase diagram 900 showing pressure vs. temperature curves for volatile oil inputs. FIGS. 10, 11, and 12 show rock-fluid interaction curves. FIG. 10 is a diagram 1000, showing relative permeabilities of water (krw) and oil (kro) for original oil-wet (_o) and altered water-wet (_w) curves. FIG. 11 is a graph 1100 showing relative permeabilities of gas (Krg) and oil (Krog) vs. liquid saturation for original oil-wet (_o) and altered water-wet (_w) curves. FIG. 12 is a graph 1200 of capillary pressure curves for both original oil-wet and altered water-wet conditions.

Figure 13:
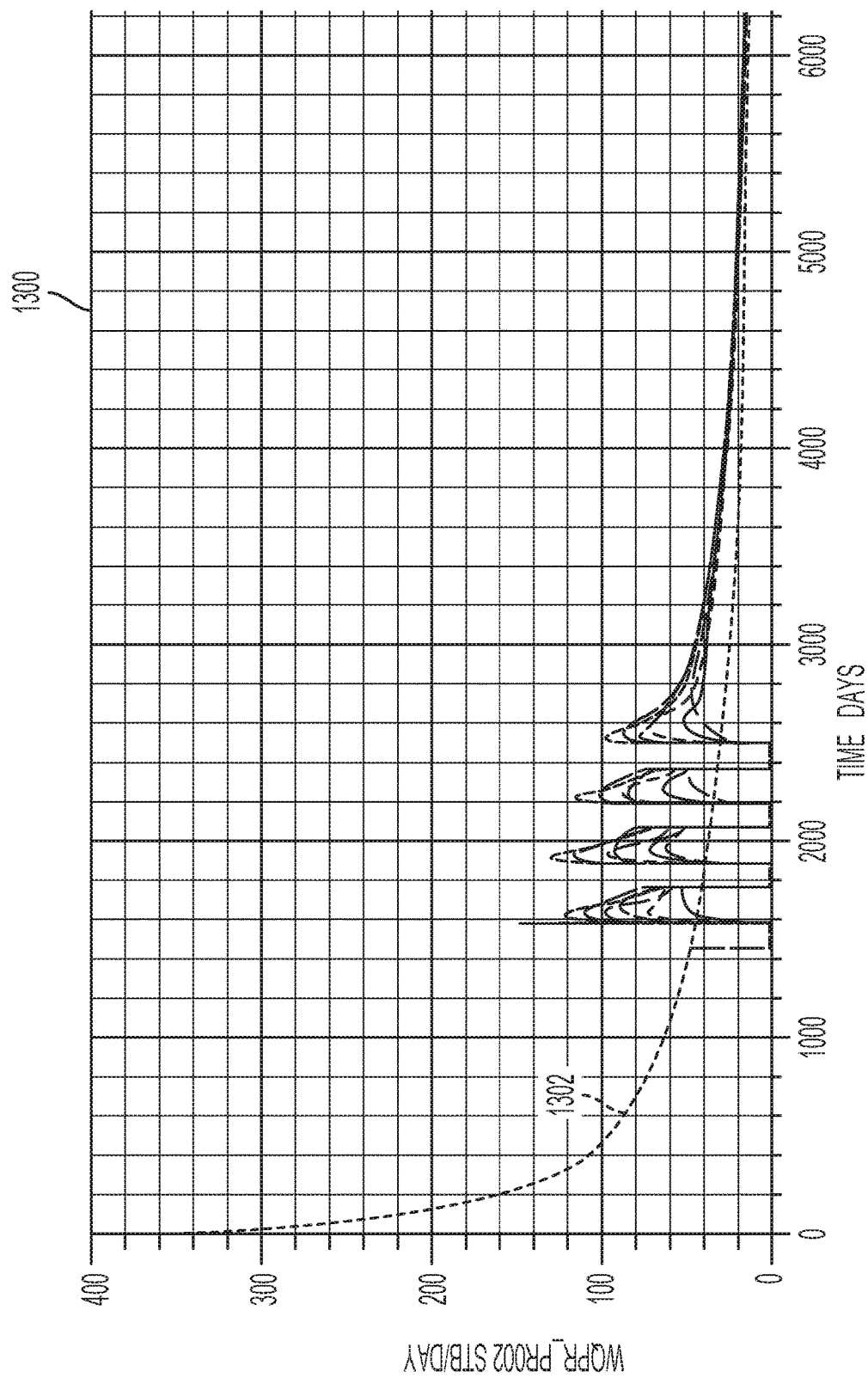
FIG. 13 is a graph showing simulation outputs for production rates for an example reservoir according to some aspects of the present disclosure.
Figure 14:
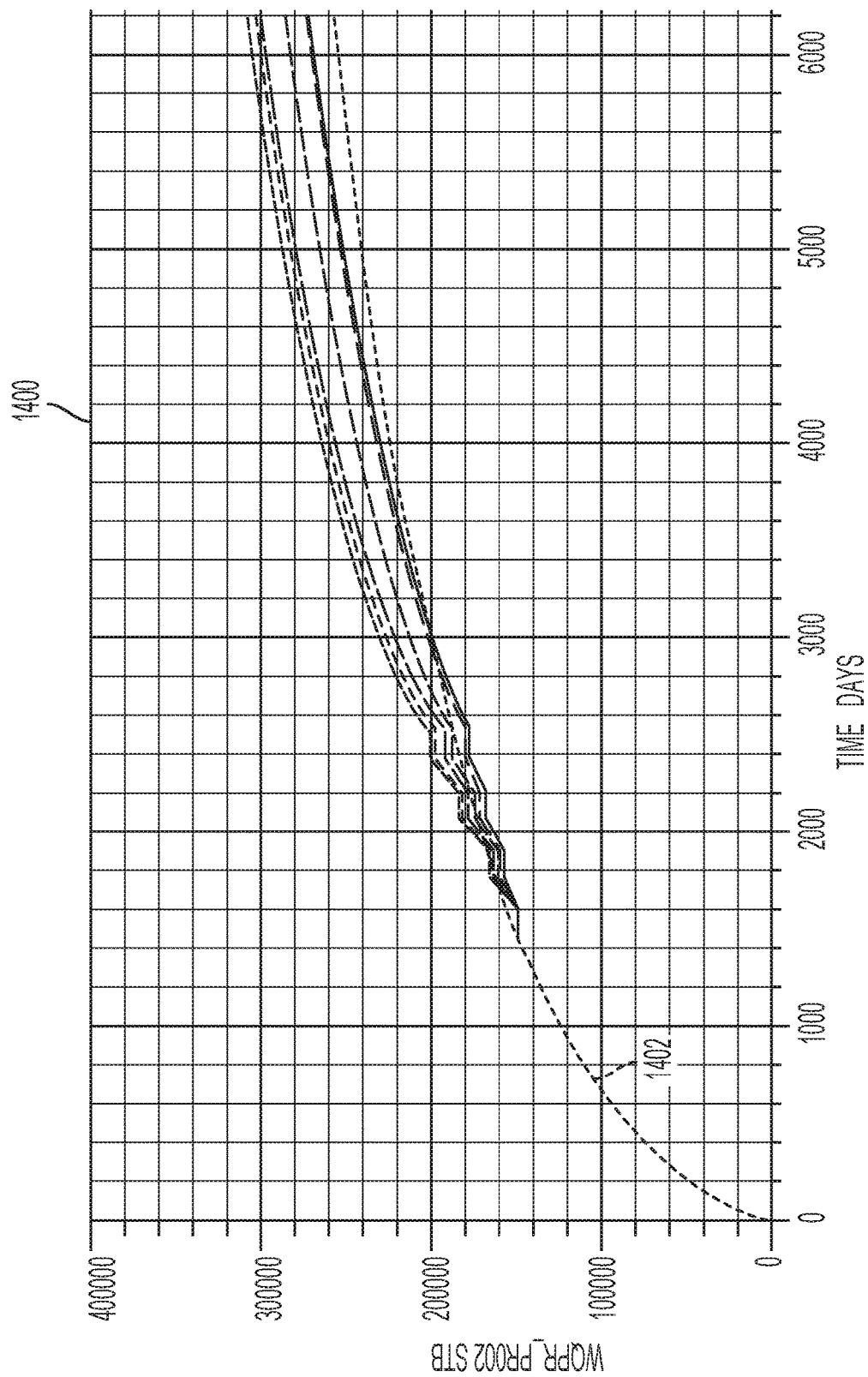
FIG. 14 is a graph showing simulation outputs for cumulative oil production for an example reservoir according to some aspects of the present disclosure.

FIG. 13 is a graph 1300 of production rates vs. time for nine production scenarios. Curve 1302 is a base curve without huff-n-puff stimulation treatment. The foam stimulated production scenario (i.e., surfactant-alternating-gas (SAG), and surfactant-gas-coinjection (SGC)) corresponds to the curve in this example with the highest production rates. The other curves with lower production rates are for other conventional fluid systems including rich gas, pure $CO_2$, pure $N_2$, surfactant, water, water-alternating-gas (WAG). FIG. 14 is a graph 1400 of cumulative production for the same nine simulated production scenarios shown in FIG. 13. Curve 1402 is a base curve.

Figure 15:
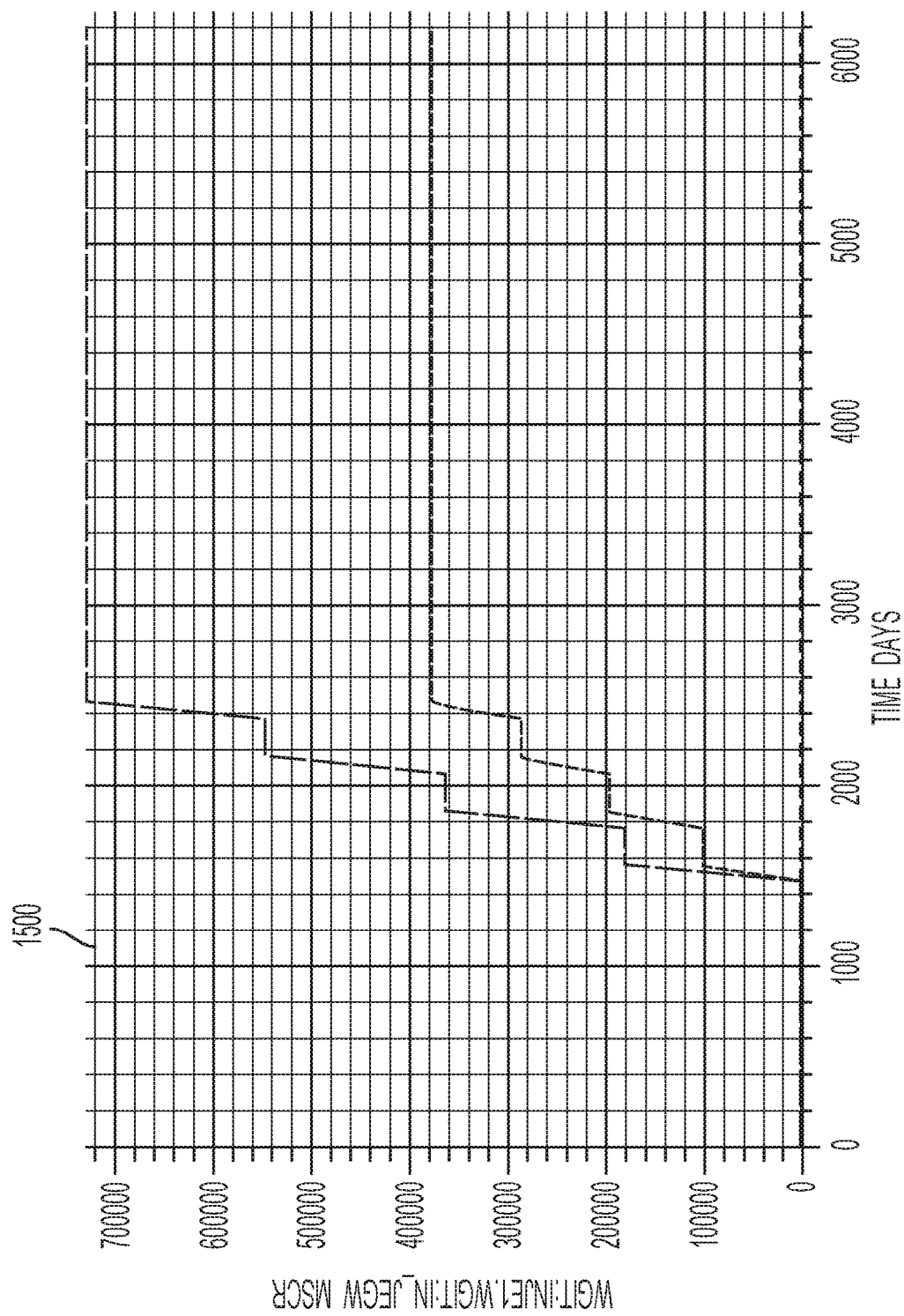
FIGS. 15 through 19 are graphs showing various simulation outputs for other well responses for an example reservoir according to some aspects of the present disclosure.
Figure 16:
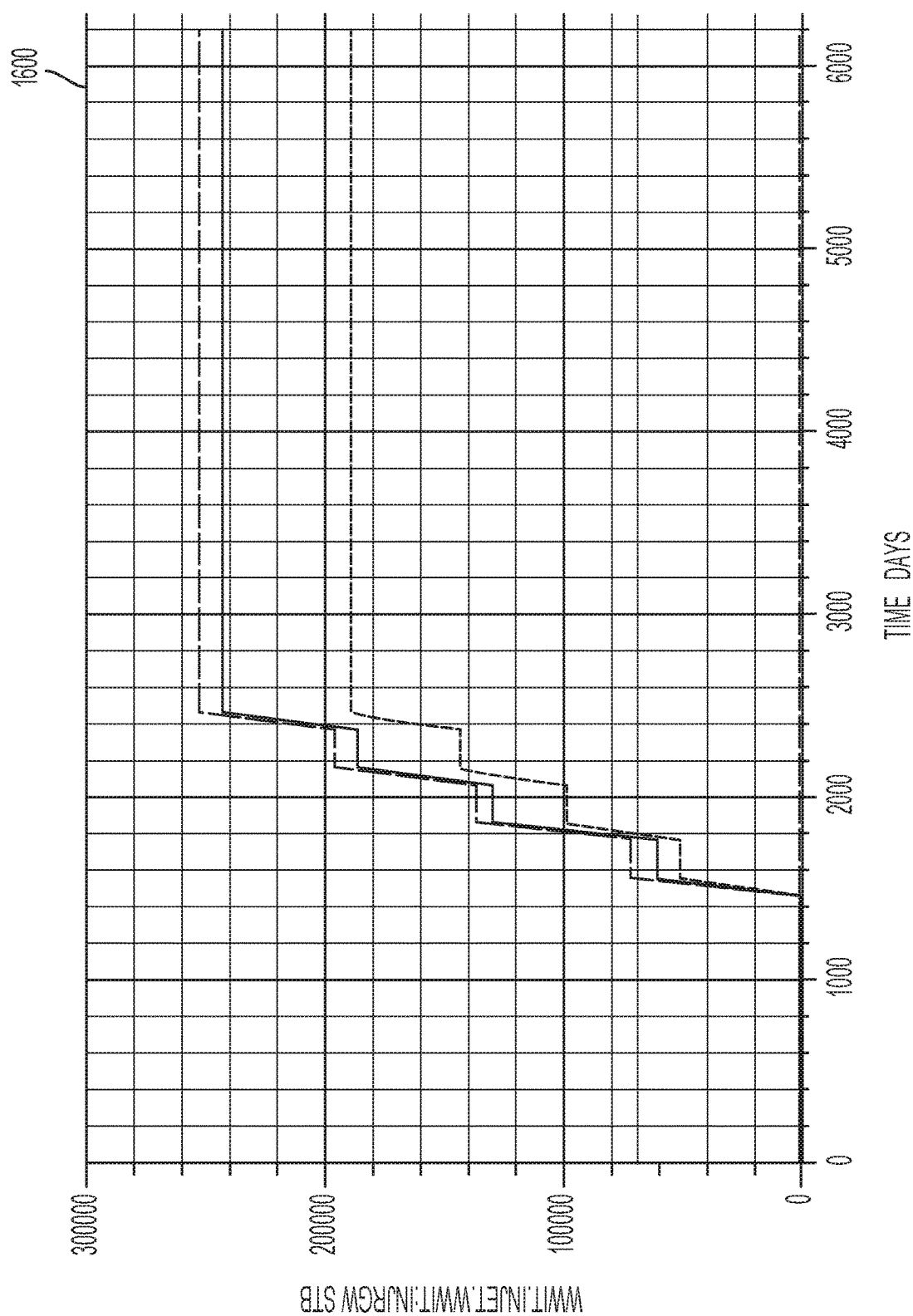
Figure 17:
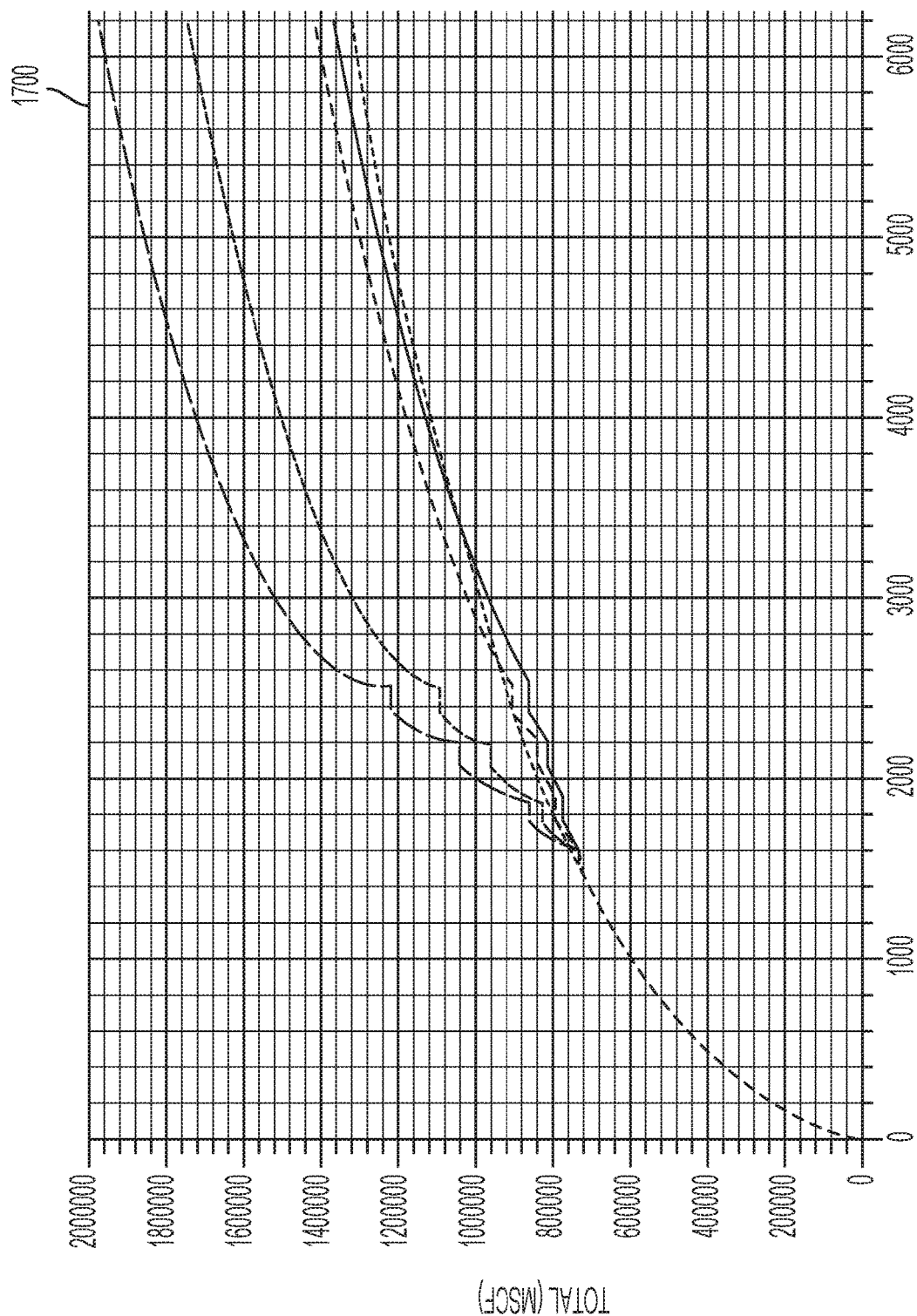
Figure 18:
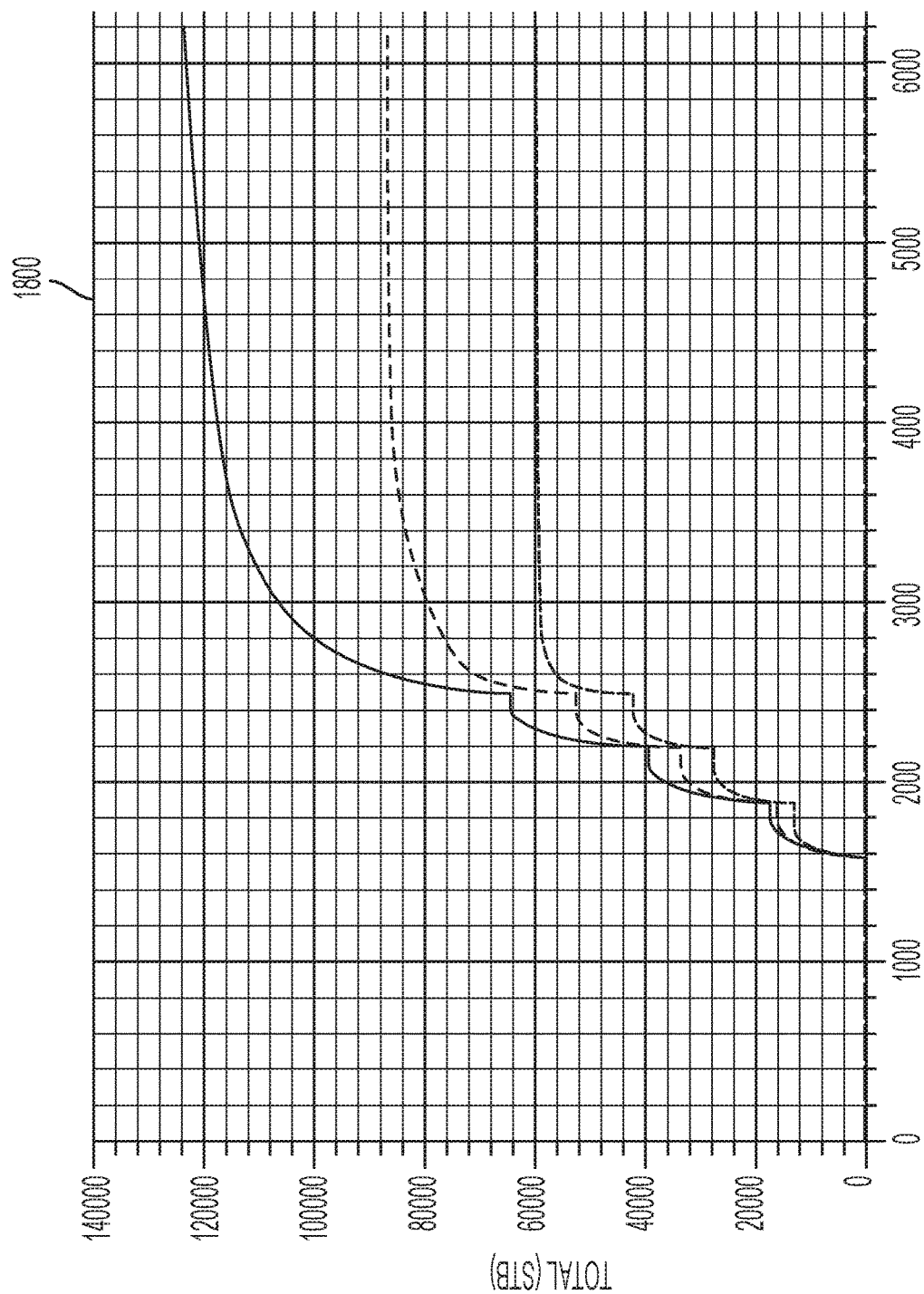
Figure 19:
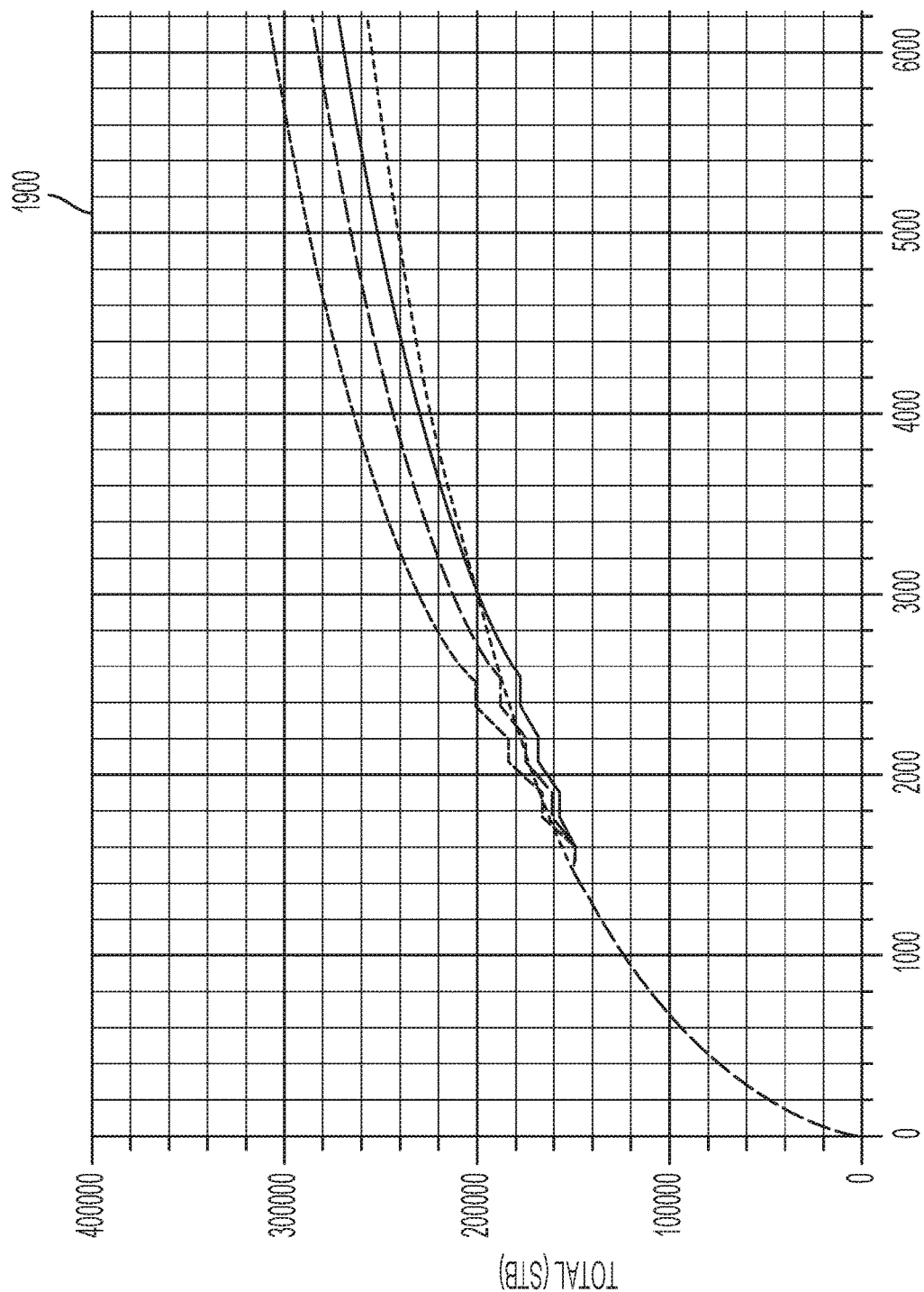

Additional simulation outputs for the above scenarios are shown in FIGS. 15-19. FIG. 15 is a graph 1500 of gas injection total over time. FIG. 16 is a graph 1600 of water injection total over time. FIG. 17 is a graph 1700 of gas production total over time. FIG. 18 is a graph 1800 of water production total over time. FIG. 19 is a graph 1900 of oil production total over time. Based on the outputs and inputs discussed above, an efficiency evaluation was performed based on material input and equipment costs. The analysis concluded that a well stimulation approach projected by the hybrid DFN-MP model, i.e., surfactant-gas-coinjection (SGC), yields high production relative to resource input, due to more oil recovery and less consumption of injected gas.

Terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. Additionally, comparative, quantitative terms such as "above," "below," "less," and "greater" are intended to encompass the concept of equality, thus, "less" can mean not only "less" in the strictest mathematical sense, but also, "less than or equal to."

Unless specifically stated otherwise, it is appreciated that throughout this specification that terms such as "processing," "calculating," "determining," "operations," or the like refer to actions or processes of a computing device, such as the controller or processing device described herein, that can manipulate or transform data represented as physical electronic or magnetic quantities within memories, registers, or other information storage devices, transmission devices, or display devices. The order of the process blocks presented in the examples above can be varied, for example, blocks can be re-ordered, combined, or broken into sub-blocks. Certain blocks or processes can be performed in parallel. The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Elements that are described as "connected," "connectable," or with similar terms can be connected directly or through intervening elements.

In some aspects, a foam fluid system is provided according to one or more of the following examples. As used below, any reference to a series of examples is to be understood as a reference to each of those examples disjunctively (e.g., "Examples 1-4" is to be understood as "Examples 1, 2, 3, or 4").

Example 1

A system includes a processing device and a non-transitory memory device including instructions that are executable by the processing device to cause the processing device to perform operations. The operations include matching a core-scale model with core plug data from a formation including a hydrocarbon reservoir to produce relative permeability curves, capillary pressure curves, and absorption and wettability alteration curves for the formation, producing a hybrid discrete fracture network and multi-porosity (DFN-MP) model for fluid interaction with the formation using the relative permeability curves, capillary pressure curves, and absorption and wettability alteration curves, optimizing the hybrid DFN-MP model using field simulation data for the formation to produce an optimized hybrid DFN-MP model for fluid interaction with the formation, and producing an optimized foam-fluid-application scenario for the hydrocarbon reservoir using the optimized hybrid DFN-MP model.

Example 2

The system of example 1 wherein the operations further include matching the hybrid DFN-MP model with type curve data for production from at least one well in the formation to reduce uncertainty in the hybrid DFN-MP model.

Example 3

The system of example(s) 1-2 wherein the core plug data further comprises at least one of imbibition data, CT scan data, contact angle, or interfacial tension.

Example 4

The system of example(s) 1-3 wherein producing the hybrid DFN-MP model includes establishing porosity types based on distributions of matrix, fractures, and kerogen. The system also includes establishing hybrid DFN geometry types, establishing both initial and altered water-wet curves, establishing pressure-volume-temperature (PVT) properties for foam components, determining chemical reactions for at least one of the foam components, and producing upscaled absorption and wettability tables from the core-scale model.

Example 5

The system of example(s) 1-4 wherein producing the hybrid DFN-MP model includes defining grid blocks along dimensions of the hydrocarbon reservoir, and assigning local grid refinement properties to the grid blocks.

Example 6

The system of example(s) 1-5 wherein optimizing the hybrid DFN-MP model includes defining potential injector and producer operation schedules, and defining potential foam entity mixtures.

Example 7

The system of example(s) 1-6 wherein the operations further include communicating the optimized foam-fluid-application scenario to at least one well in the formation.

Example 8

A method includes matching, by a processing device, a core-scale model with core plug data from a formation including a hydrocarbon reservoir to produce relative permeability curves, capillary pressure curves, and absorption and wettability alteration curves for the formation and producing, by the processing device, a hybrid discrete fracture network and multi-porosity (DFN-MP) model for fluid interaction with the formation using the relative permeability curves, capillary pressure curves, and absorption and wettability alteration curves. The method further includes optimizing, by the processing device, the hybrid DFN-MP model using field simulation data for the formation to produce an optimized hybrid DFN-MP model for fluid interaction with the formation, and producing, using the processing device, an optimized foam-fluid-application scenario for the hydrocarbon reservoir using the optimized hybrid DFN-MP model.

Example 9

The method of example 8 further including matching the hybrid DFN-MP model with type curve data for production from at least one well in the formation to reduce uncertainty in the hybrid DFN-MP model.

Example 10

The method of example(s) 8-9 wherein the core plug data further comprises at least one of imbibition data, CT scan data, contact angle, or interfacial tension.

Example 11

The method of example(s) 8-10 further including defining grid blocks along dimensions of the hydrocarbon reservoir, assigning local grid refinement properties to the grid blocks, establishing both initial and altered water-wet curves, establishing pressure-volume-temperature (PVT) properties for foam components, determining chemical reactions for at least one of the foam components, and producing upscaled absorption and wettability tables from the core-scale model to produce the hybrid DFN-MP model.

Example 12

The method of example(s) 8-11 further including defining potential injector and producer operation schedules; and defining potential foam entity mixtures.

Example 13

The method of example(s) 8-12 further including applying the optimized foam-fluid-application scenario to at least one well in the formation.

Example 14

A non-transitory computer-readable medium includes instructions that are executable by a processing device for causing the processing device to perform operations to produce an optimized foam-fluid-application scenario for a hydrocarbon reservoir. The operations include matching a core-scale model with core plug data from a formation including a hydrocarbon reservoir to produce relative permeability curves, capillary pressure curves, and absorption and wettability alteration curves for the formation, producing a hybrid discrete fracture network and multi-porosity (DFN-MP) model for fluid interaction with the formation using the relative permeability curves, capillary pressure curves, and absorption and wettability alteration curves, optimizing the hybrid DFN-MP model using field simulation data for the formation to produce an optimized hybrid DFN-MP model for fluid interaction with the formation, and producing an optimized foam-fluid-application scenario for the hydrocarbon reservoir using the optimized hybrid DFN-MP model.

Example 15

The non-transitory computer-readable medium of example 14 wherein the operations also matching the hybrid DFN-MP model with type curve data for production from at least one well in the formation to reduce uncertainty in the hybrid DFN-MP model.

Example 16

The non-transitory computer-readable medium of example(s) 14-15 wherein the core plug data further comprises at least one of imbibition data, CT scan data, contact angle, or interfacial tension.

Example 17

The non-transitory computer-readable medium of example(s) 14-16 wherein producing the hybrid DFN-MP model includes establishing both initial and altered water-wet curves, establishing pressure-volume-temperature (PVT) properties for foam components, determining chemical reactions for at least one of the foam components, and producing upscaled absorption and wettability tables from the core-scale model.

Example 18

The non-transitory computer-readable medium of example(s) 14-17 wherein producing the hybrid DFN-MP model includes defining grid blocks along dimensions of the hydrocarbon reservoir, and assigning local grid refinement properties to the grid blocks.

Example 19

The non-transitory computer-readable medium of example(s) 14-18 wherein optimizing the hybrid DFN-MP model includes defining potential injector and producer operation schedules, and defining potential foam entity mixtures.

Example 20

The non-transitory computer-readable medium of example(s) 14 wherein the operations include communicating the optimized foam-fluid-application scenario to at least one well in the formation.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:
1. A system comprising:
a processing device; and a non-transitory memory device comprising instructions that are executable by the processing device to cause the processing device to perform operations comprising:
matching a core-scale model with core plug data from a formation including a hydrocarbon reservoir to produce relative permeability curves, capillary pressure curves, and absorption and wettability alteration curves for the formation;
producing a hybrid discrete fracture network and multi-porosity (DFN-MP) model for fluid interaction with the formation using the relative permeability curves, capillary pressure curves, and absorption and wettability alteration curves, wherein the operation of producing the hybrid DFN-MP model includes operations comprising:
establishing both initial and altered water-wet curves;
establishing pressure-volume-temperature (PVT) properties for foam components;
determining chemical reactions for at least one of the foam components; and
producing upscaled absorption and wettability tables from the core-scale model;
optimizing the hybrid DFN-MP model using field simulation data for the formation to produce an optimized hybrid DFN-MP model for fluid interaction with the formation;
producing an optimized foam-fluid-application scenario for the hydrocarbon reservoir using the optimized hybrid DFN-MP model; and
controlling performance of the optimized foam-fluid-application scenario within a wellbore.

2. The system of claim 1 wherein the operations further comprise matching the hybrid DFN-MP model with type curve data for production from at least one well in the formation to reduce uncertainty in the hybrid DFN-MP model.

3. The system of claim 1 wherein the core plug data further comprises at least one of imbibition data, CT scan data, contact angle, or interfacial tension.

4. The system of claim 1 wherein producing the hybrid DFN-MP model includes operations further comprising:
establishing porosity types based on distributions of matrix, fractures, and kerogen; and
establishing hybrid DFN geometry types.

5. The system of claim 1 wherein producing the hybrid DFN-MP model includes operations comprising:
defining grid blocks along dimensions of the hydrocarbon reservoir; and
assigning local grid refinement properties to the grid blocks.

6. The system of claim 1 wherein optimizing the hybrid DFN-MP model includes operations comprising:
defining potential injector and producer operation schedules; and
defining potential foam entity mixtures.

7. The system of claim 1 wherein the operations further comprise communicating the optimized foam-fluid-application scenario to at least one well in the formation.

8. A method comprising:
matching, by a processing device, a core-scale model with core plug data from a formation including a hydrocarbon reservoir to produce relative permeability curves, capillary pressure curves, and absorption and wettability alteration curves for the formation;
producing, by the processing device, a hybrid discrete fracture network and multi-porosity (DFN-MP) model for fluid interaction with the formation using the relative permeability curves, capillary pressure curves, and absorption and wettability alteration curves, wherein producing the hybrid DFN-MP model includes operations comprising:
establishing both initial and altered water-wet curves;
establishing pressure-volume-temperature (PVT) properties for foam components;
determining chemical reactions for at least one of the foam components; and
producing upscaled absorption and wettability tables from the core-scale model;
optimizing, by the processing device, the hybrid DFN-MP model using field simulation data for the formation to produce an optimized hybrid DFN-MP model for fluid interaction with the formation; and
producing, using the processing device, an optimized foam-fluid-application scenario for the hydrocarbon reservoir using the optimized hybrid DFN-MP model; and
controlling, using the processing device, performance of the optimized foam-fluid-application scenario within a wellbore.

9. The method of claim 8 further comprising matching the hybrid DFN-MP model with type curve data for production from at least one well in the formation to reduce uncertainty in the hybrid DFN-MP model.

10. The method of claim 8 wherein the core plug data further comprises at least one of imbibition data, CT scan data, contact angle, or interfacial tension.

11. The method of claim 8 further comprising:
defining grid blocks along dimensions of the hydrocarbon reservoir; and
assigning local grid refinement properties to the grid blocks.

12. The method of claim 8 further comprising:
defining potential injector and producer operation schedules; and
defining potential foam entity mixtures.

13. The method of claim 8 further comprising applying the optimized foam-fluid-application scenario to at least one well in the formation.

14. A non-transitory computer-readable medium that includes instructions that are executable by a processing device for causing the processing device to perform operations to produce an optimized foam-fluid-application scenario for a hydrocarbon reservoir, the operations comprising:
matching a core-scale model with core plug data from a formation including a hydrocarbon reservoir to produce relative permeability curves, capillary pressure curves, and absorption and wettability alteration curves for the formation;
producing a hybrid discrete fracture network and multi-porosity (DFN-MP) model for fluid interaction with the formation using the relative permeability curves, capillary pressure curves, and absorption and wettability alteration curves, wherein the operation of producing the hybrid DFN-MP model includes operations comprising:
establishing both initial and altered water-wet curves;
establishing pressure-volume-temperature (PVT) properties for foam components;
determining chemical reactions for at least one of the foam components; and producing upscaled absorption and wettability tables from the core-scale model;

optimizing the hybrid DFN-MP model using field simulation data for the formation to produce an optimized hybrid DFN-MP model for fluid interaction with the formation;

producing an optimized foam-fluid-application scenario for the hydrocarbon reservoir using the optimized hybrid DFN-MP model; and controlling performance of the optimized foam-fluid-application scenario within a wellbore.

15. The non-transitory computer-readable medium of claim 14 wherein the operations further comprise matching the hybrid DFN-MP model with type curve data for production from at least one well in the formation to reduce uncertainty in the hybrid DFN-MP model.

16. The non-transitory computer-readable medium of claim 14 wherein the core plug data further comprises at least one of imbibition data, CT scan data, contact angle, or interfacial tension.

17. The non-transitory computer-readable medium of claim 14 wherein producing the hybrid DFN-MP model includes operations comprising:

defining grid blocks along dimensions of the hydrocarbon reservoir; and assigning local grid refinement properties to the grid blocks.

18. The non-transitory computer-readable medium of claim 14 wherein optimizing the hybrid DFN-MP model includes operations comprising:

defining potential injector and producer operation schedules; and defining potential foam entity mixtures.

19. The non-transitory computer-readable medium of claim 14 wherein the operations further comprise communicating the optimized foam-fluid-application scenario to at least one well in the formation.

* * * * *